(12) United States Patent
Naitou

(10) Patent No.: US 11,194,316 B2
(45) Date of Patent: Dec. 7, 2021

(54) CONTROLLER AND CONTROL METHOD FOR COLLABORATIVE ROBOT

(71) Applicant: Fanuc Corporation, Yamanashi (JP)

(72) Inventor: Yasuhiro Naitou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 205 days.

(21) Appl. No.: 16/352,092

(22) Filed: Mar. 13, 2019

(65) Prior Publication Data

US 2019/0302741 A1 Oct. 3, 2019

(30) Foreign Application Priority Data

Mar. 29, 2018 (JP) .............................. JP2018-065008

(51) Int. Cl.
*G05B 15/00* (2006.01)
*G05B 19/418* (2006.01)
*B23P 21/00* (2006.01)
*B25J 9/00* (2006.01)

(52) U.S. Cl.
CPC .......... *G05B 19/4182* (2013.01); *B23P 21/00* (2013.01); *B25J 9/0093* (2013.01); *G05B 2219/39102* (2013.01)

(58) Field of Classification Search
CPC ...... G05B 19/4182; G05B 2219/39102; G05B 2219/40201; G05B 2219/40202; B23P 21/00; B23P 2700/50; B25J 9/0093; B25J 19/06; B25J 13/085; B25J 9/1674; B25J 13/08; B25J 9/1679; B25J 9/1694
USPC ....................................................... 700/258
See application file for complete search history.

(56) References Cited

U.S. PATENT DOCUMENTS

| 5,724,489 A | * | 3/1998 | Yamamoto | G05B 19/4182 |
| | | | | 700/245 |
| 10,471,603 B2 | | 11/2019 | Yuelai et al. | |
| 2009/0222134 A1 | * | 9/2009 | Franke | G05B 19/4061 |
| | | | | 700/251 |
| 2011/0010012 A1 | * | 1/2011 | Murayama | G05B 19/423 |
| | | | | 700/260 |
| 2011/0280691 A1 | * | 11/2011 | Yabe | B25J 9/0084 |
| | | | | 414/222.01 |

(Continued)

FOREIGN PATENT DOCUMENTS

| JP | 62147507 A | 7/1987 |
| JP | 01183388 A | 7/1989 |

(Continued)

*Primary Examiner* — B M M Hannan
(74) *Attorney, Agent, or Firm* — RatnerPrestia

(57) ABSTRACT

A robot controller and a robot control method, by which a human can be prevented from being sandwiched between a collaborative robot and a workpiece conveyed by a conveyor. The robot controller controls the robot configured to perform a predetermined operation for the workpiece conveyed by a convey section moving in a convey direction. The robot controller has: a receive section configured to receive a signal representing that an abnormality of the robot is detected or contact against the robot is detected; and a motion control section configured to control a motion of robot so that, after the receive section receives the signal, a minimum distance between a movable section of the robot and the workpiece is not less than a predetermined safe distance.

6 Claims, 5 Drawing Sheets

(56) References Cited

U.S. PATENT DOCUMENTS

| | | | | |
|---|---|---|---|---|
| 2012/0323357 A1* | 12/2012 | Izumi | ............... | G05B 19/4182 |
| | | | | 700/228 |
| 2012/0323358 A1* | 12/2012 | Izumi | ..................... | G06K 9/34 |
| | | | | 700/230 |
| 2015/0081099 A1* | 3/2015 | Komatsu | ............... | B25J 13/085 |
| | | | | 700/258 |
| 2015/0328771 A1* | 11/2015 | Yuelai | ................... | B25J 13/085 |
| | | | | 414/730 |
| 2016/0016315 A1* | 1/2016 | Kuffner, Jr. | ........... | B25J 9/1676 |
| | | | | 700/255 |
| 2016/0068352 A1* | 3/2016 | Oda | ...................... | B65G 43/08 |
| | | | | 700/213 |
| 2016/0083199 A1* | 3/2016 | Nishizaka | .............. | B25J 19/023 |
| | | | | 414/567 |
| 2016/0279796 A1* | 9/2016 | Naitou | ................... | B25J 9/1676 |
| 2017/0066133 A1* | 3/2017 | Ooba | .................... | B25J 9/1697 |
| 2017/0357242 A1* | 12/2017 | Watanabe | ............. | B25J 9/1666 |
| 2018/0104820 A1* | 4/2018 | Troy | ....................... | G01B 3/28 |
| 2018/0222050 A1* | 8/2018 | Vu | ......................... | B25J 9/1676 |
| 2018/0222052 A1* | 8/2018 | Vu | ......................... | G01S 17/04 |
| 2018/0257238 A1* | 9/2018 | Hashimoto | ........... | B25J 9/1641 |

FOREIGN PATENT DOCUMENTS

| | | |
|---|---|---|
| JP | 2004-203312 A | 7/2004 |
| JP | 2009-202281 A | 9/2009 |
| JP | 2013-169616 A | 9/2013 |
| JP | 2014018901 A | 2/2014 |
| JP | 2014-140944 A | 8/2014 |
| JP | 2015217451 A | 12/2015 |

\* cited by examiner

CONTROLLER AND CONTROL METHOD FOR COLLABORATIVE ROBOT

CROSS-REFERENCE TO RELATED APPLICATIONS

This application is a new U.S. Patent Application that claims benefit of Japanese Patent Application No. 2018-065008, filed Mar. 29, 2018, the disclosure of this application is being incorporated herein by reference in its entirety for all purposes.

BACKGROUND OF THE INVENTION

1. Field of the Invention

The present invention relates to a robot controller and a robot control method for controlling a collaborative robot.

2. Description of the Related Art

In the prior art, a technique to carry out an operation is well known, in which a robot attaches components to an object such as a car body conveyed by a conveyor, etc. (e.g., see JP 2013-169616 A).

On the other hand, a technique to prevent a robot and/or a workpiece from being damaged, when a conveyor is suddenly stopped or accelerated, is well known (e.g., see JP 2014-140944 A and JP 2009-202281 A). Further, a technique to prevent car parts and/or an operator from being damaged, when an outer force is accidentally applied to the car parts or a jig thereof, is well known (e.g., see JP 2004-203312 A).

In the prior art, an operation for attaching components to a workpiece being conveyed by a conveyor is usually carried out by a human (operator), and thus it is desired that such an operation is automatically performed by a robot. In this regard, since it is not practical for the robot to perform all operations, from the aspect of cost and technology, it is proposed that some of the operations, which have been carried out by the human, are performed by the robot. In such a case, since the human and the robot share the same working area, a collaborative robot, having a function to stop the motion thereof for safety when the operator contacts the robot, is used.

In the case that the collaborative robot performs an operation for a workpiece being moved by a conveyor, the robot stops the motion thereof or evacuates toward a predetermined position for safety, when the operator comes into contact with the robot. However, when the conveyor continues to move after the robot is stopped, the workpiece may collide with the stopped robot, whereby the workpiece and/or the robot may be damaged. Further, the distance between the robot and the workpiece is shortened due to the evacuating motion of the robot, whereby the operator may be injured by being sandwiched between the workpiece and the robot.

SUMMARY OF THE INVENTION

One aspect of the present disclosure is a robot controller configured to control a robot, the robot being configured to perform an operation for a workpiece conveyed by a convey section configured to move in a predetermined convey direction, and being located at a position different from the convey section, the robot controller comprising: a receive section configured to receive a signal representing that an abnormality of the robot is detected or contact against the robot is detected; and a motion control section configured to control a motion of the robot so that, after the receive section receives the signal, a minimum distance between a movable section of the robot and the workpiece is not less than a predetermined safe distance.

Another aspect of the present disclosure is a robot control method of controlling a robot, the robot being configured to perform an operation for a workpiece conveyed by a convey section configured to move in a predetermined convey direction, and being located at a position different from the convey section, the robot control method comprising: receiving a signal representing that an abnormality of the robot is detected or contact against the robot is detected; and controlling a motion of the robot so that, after receiving the signal, a minimum distance between a movable section of the robot and the workpiece is not less than a predetermined safe distance.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 5b shows an example in which an abnormality or contact regarding the robot is detected in the state of FIG. 5a;

FIG. 6b shows an example in which the abnormality or contact regarding the robot is detected in the state of FIG. 6a;

FIG. 7b shows an example in which the abnormality or contact regarding the robot is detected in the state of FIG. 7a.

DETAILED DESCRIPTIONS

Figure 1:
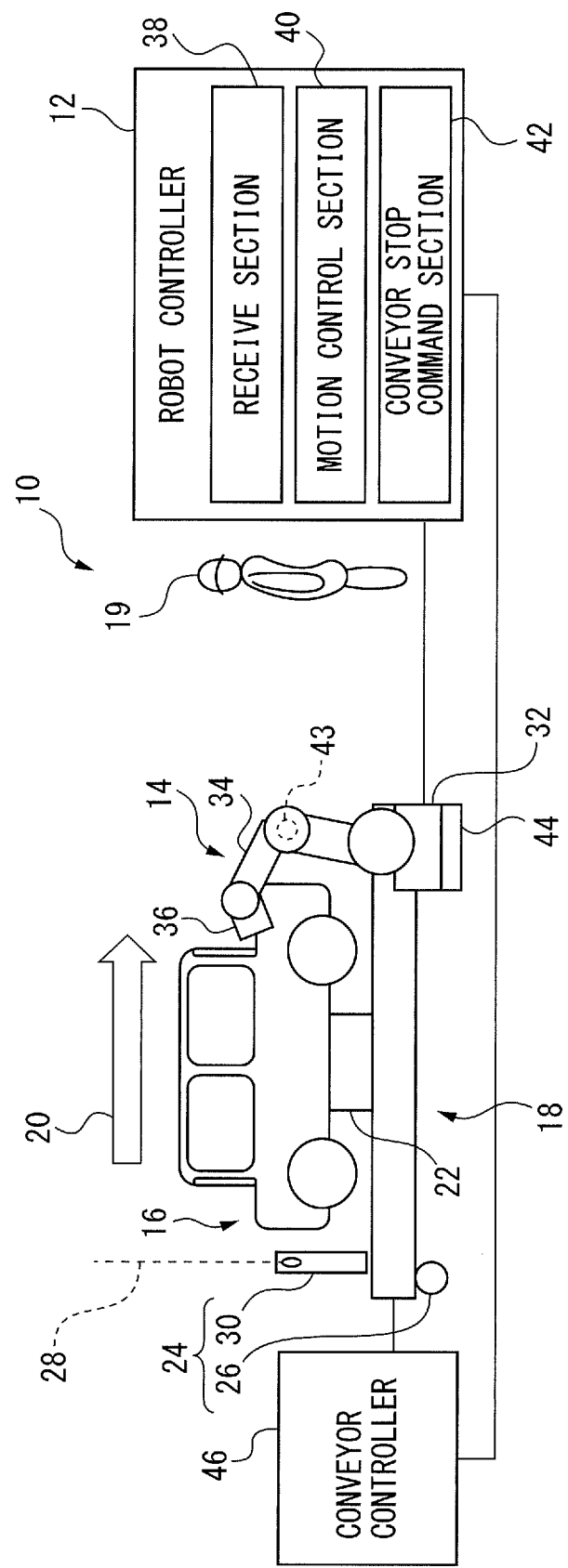
FIG. 1 shows an example of a configuration of a collaborative robot system.

FIG. 1 shows an example of a schematic configuration of a collaborative robot system including a robot controller according to a preferred embodiment. Collaborative robot system 10 has: a robot controller 12; a collaborative robot (hereinafter, also referred to as a robot) 14 controlled by robot controller 12; and a conveying device (or a conveyor) 18 configured to convey a workpiece (in the drawing, a car body) 16 corresponding to a work object of robot 14, wherein robot 14 is configured to perform a predetermined operation for car body 16. In collaborative robot system 10, a human (operator) 19 can carry out a predetermined operation for workpiece 16 (e.g., attaching or assembling components to workpiece 16), and thus operator 19 and robot 14 share a common working area. Therefore, operator 19 may accidentally contact or collide with robot 14.

Conveyor 18 may have various structures such as a belt conveyor, a skid conveyor and an overhead conveyor, etc., configured to convey designated workpiece 16. Concretely, conveyor 18 has: a convey section 22 configured to hold workpiece 16 and move in a predetermined convey direction (in the drawing, from left to right as indicated by an arrow 20); and a position detection section 24 configured to detect the position of convey section 22 (or workpiece 16) and transmit a result of detection to robot controller 12. For example, position detection section 24 may have an encoder 26 arranged in conveyor 18 (concretely, attached to a motor, etc., for driving convey section 22), and an infrared sensor 30 configured to detect that the workpiece has passed through a predetermined convey directional position (as exemplified by a dashed line 28).

Figure 2:
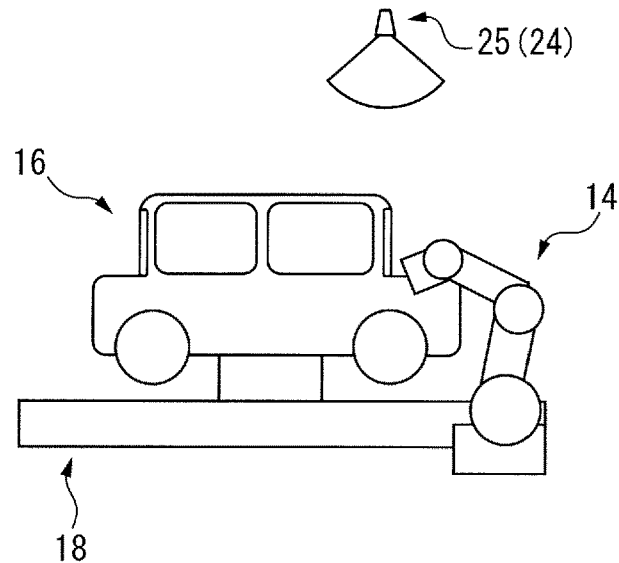
FIG. 2 shows an example in which a camera is used as a position detection section.
Figure 3:
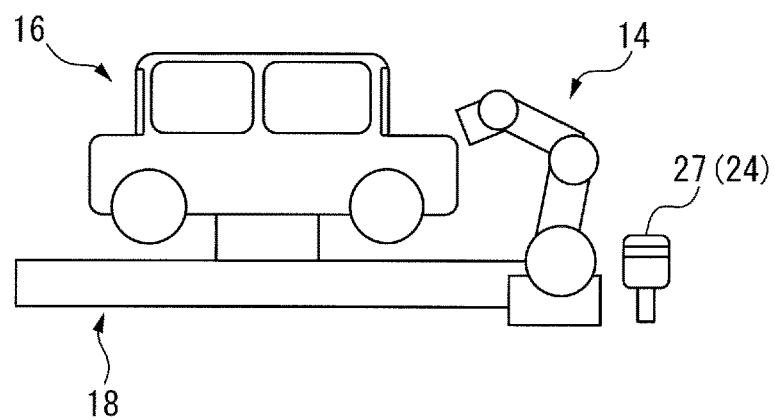
FIG. 3 shows an example in which an area sensor is used as the position detection section.
Figure 4:
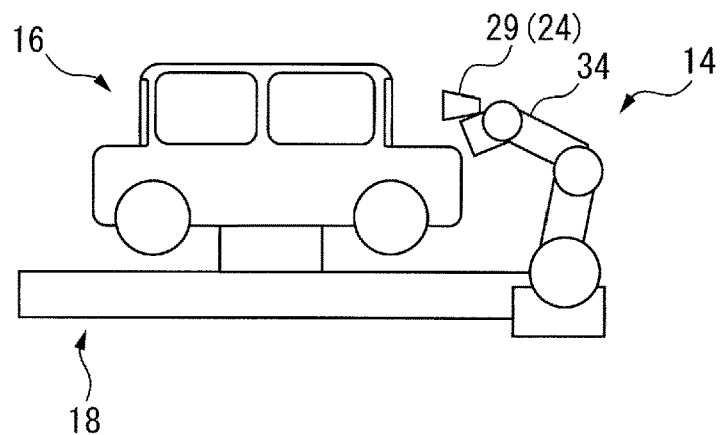
FIG. 4 shows an example in which a three-dimensional sensor is used as the position detection section.

In collaborative robot system 10, a value of encoder 26 when workpiece 16 passes through position 28 is stored, and the values (outputs) of encoder 26 are obtained at predetermined time intervals. By virtue of this, the position of convey section 22 (workpiece 16) relative to robot 14, the velocity of convey section 22, and a coasting distance (as explained below), etc., can be calculated in real-time. Alternatively, exemplified in FIG. 2, as position detection section 24, a two-dimensional sensor 25 such as a camera may be arranged at an upper side or a lateral side of conveyor 18. In such a case, based on a processing result of an image of the camera obtained at predetermined time intervals, the positional relationship between workpiece 16 and robot 14 can be calculated at the predetermined time intervals. As another example of position detection section 24, an area sensor 27 may be arranged at a lateral side of conveyor 18 (FIG. 3), or a three-dimensional sensor 29 may be arranged at the lateral side of conveyor 18 (FIG. 4).

Otherwise, the positional relationship between robot 14 and workpiece 16 may be previously stored in a memory, etc., and then, when the operation (or a series of motions) of robot 14 for workpiece 16 is to be taught, the robot controller may judge which of a first and second states (as explained below) corresponds to the positional relationship when conveyor 18 starts an stop operation. In such a case, the unit (e.g., a processor) for performing the judgment may correspond to the position detection section.

For example, robot 14 may be a multi-jointed industrial robot having six axes, and may have: a base section 32 located at a position (e.g., a floor near conveyor 18) different from the location of convey section 22; a movable section 34, such as a robot arm, movably attached to base section 32; an end effector 36 attached to a front end of robot arm 34. Robot 14 is configured to perform a predetermined operation (e.g., attaching components (not shown) to workpiece 16, and processing a part of workpiece 16, etc.), based on a command from robot controller 12.

Robot controller 12 has a receive section 38 configured to receive a signal representing that an abnormality of robot 14 is detected or contact against robot 14 is detected; and a motion control section 40 configured to control a motion of robot 14 so that, after receive section 38 receives the signal, a minimum distance between the movable section of robot 14 and workpiece 16 is not less than a predetermined safe distance.

Herein, the "abnormality" of robot 14 may mean a defect by which the normal motion of the robot must be stopped or suspended (e.g., the robot must immediately stop or perform the evacuating motion). For example, a case in which robot arm 34 is controlled so as to move at a velocity higher than an upper limit determined based on specs, etc., thereof, or a case in which robot arm 34 is controlled to pass through a singular point, may correspond to the abnormality of the robot. In general, a teaching operation for robot 14 is carried out when conveyor 18 is in a resting state. Therefore, in the case that robot 14 is controlled so as to move as taught when conveyor 18 is in an operating (moving) state, a command for robot arm 34, by which robot arm 34 may be moved at the velocity higher than the upper limit thereof, may be generated. Further, when the teaching is not properly carried out, a representative point (e.g., a tool center point) of robot 14 may pass through the singular point. Such an abnormality can be detected by an encoder 43, etc., provided to each axis of robot 14, as shown in FIG. 1. When encoder 43 detects the abnormality as described above, the encoder may promptly output and transmit a signal representing the abnormality to receive section 38.

Herein, the "contact" against robot 14 may mean that an object such as the human or the workpiece (in many cases, accidentally) comes into contact with robot 14. For example, the contact against robot 14 can be detected by a contact sensor arranged on a surface of robot 14, a torque sensor provided to each axis of robot 14, or a six-axis force sensor 44 (FIG. 1) arranged at a lower part of base section 32, etc. When the sensor as described above detects the contact against robot 14, the sensor can output and transmit a signal representing the contact to receive section 38.

In the present disclosure, the signal, representing that the abnormality of robot 14 or the contact against robot 14 is detected, is transmitted from a transmission section (which corresponds to encoder 43, the contact sensor, the torque sensor or force sensor 44 in the embodiment). In this regard, it is not necessary to stop conveyor 18 when receive section 38 receives the signal. Further, robot 14 may be controlled so as to perform a normal motion, after the abnormality relating to robot 14 is dissolved. By virtue of such a process, a production efficiency of a robot system can be improved, in particular when the robot system includes a plurality of robots and/or the robot having the abnormality should be promptly restored). Optionally, robot controller 12 may have a convey stop command section 42 configured to output a convey stop command for stopping conveyor 18 (convey section 22), when receive section 38 receives the signal representing that the abnormality of robot 14 or the contact against robot 14 is detected.

Robot controller 12 may have an input section such as a keyboard or touch panel (not shown), so that operator 19 can configure various settings. The components of robot controller 12, such as receive section 38, motion control section 40 and convey stop command section 42, may be realized as software for activating a processor such as a CPU of a computer. Alternatively, the components may be realized as hardware such as a processor and/or a memory, configured to at least partially execute the process of the software.

For example, the convey stop command is transmitted to a conveyor controller 46 configured to control conveyor 18, and conveyor controller 46 has an arithmetic processing unit (processor) and a storage unit (memory), so as to execute the stop operation of convey section 22 based on the convey stop command. In this regard, convey section 22 is stopped not only when the contact against the robot is detected. In other words, the stop operation of convey section 22 may be initiated when convey section 22 should be stopped in view of safety, e.g., when an abnormality occurs in conveyor 18 or robot 14, etc. In addition, (the function of) conveyor controller 46 may be incorporated in robot controller 12.

Next, the motion control of the robot, after receive section 38 receives the above signal relating to the abnormality or contact, will be explained with reference to FIGS. 5a to 7b.

After receive section 38 receives the signal from encoder 43 or sensor 44, etc., motion control section 40 of robot controller 12 controls the motion of robot 14 so that robot arm 34 is separated away from workpiece 16 by a predetermined safe distance or more. Herein, the "safe distance" means a distance for the safety of the human, i.e., human 19 sandwiched between robot arm 34 and workpiece 16, separated from each other by the safe distance or more, cannot be injured. For example, the safe distance may be set to a value from 500 millimeters to 1 meter.

Figure 5A:
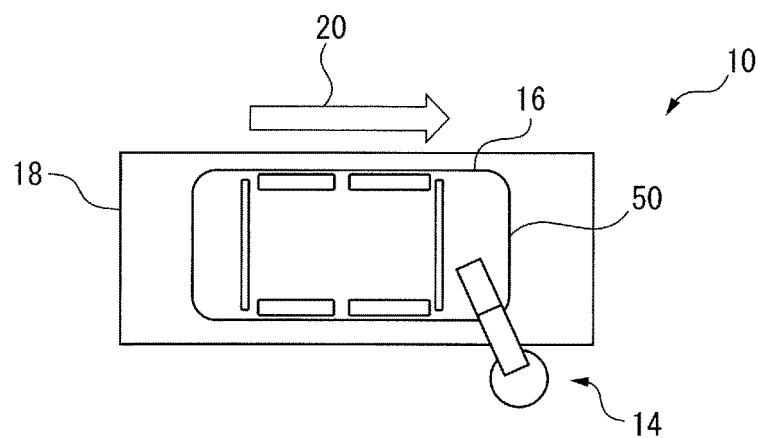
FIG. 5a shows a state in which a robot is positioned anterior to a workpiece with respect to a convey direction.
Figure 5B:
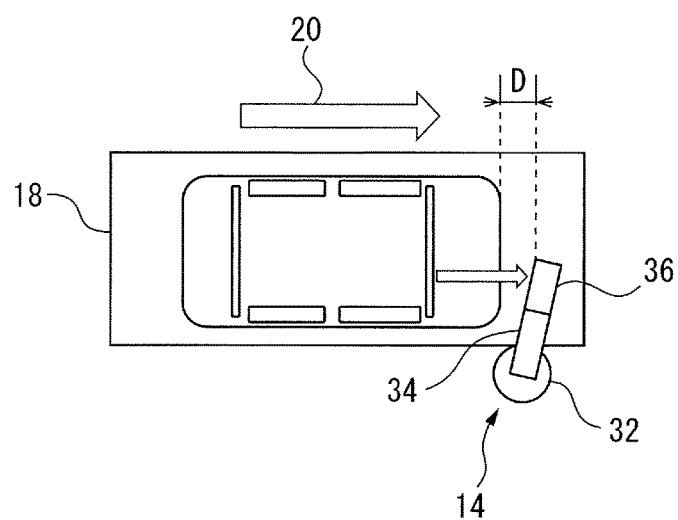

FIG. 5a shows an example of the movement direction of robot arm 34. In the example of FIG. 5a, when the abnormality or the contact relating to robot 14 is detected (i.e., the signal is received), robot arm 34 is positioned anterior to workpiece 16 with respect to convey direction 20. Then, after the signal is received, robot arm 34 is moved in the same direction as convey direction 20 of conveyor 18 at the velocity higher than conveyor 18. Therefore, as shown in FIG. 5b, at least a safe distance D is obtained between the movable section (robot arm 34 or end effector 36) of the robot and workpiece 16, whereby the safety of the human can be secured. In this regard, conveyor 18 (convey section 22) may continue to move after the abnormality or the contact relating to robot 14 is detected, and in such a case, robot 14 is controlled so that the minimum distance between the movable section of the robot and workpiece 16 is equal to safe distance D or more.

In the present disclosure, the condition that "the movable section of the robot is positioned anterior to the workpiece with respect to the convey direction" means the state in which the workpiece does not exist anterior to the position of the movable section (e.g., a representative point such as a tool center point) of the robot with respect to the convey direction, and when the movable section is moved in the convey direction, the distance between the movable section and the workpiece will be lengthened. For example, the state indicated in FIG. 5a corresponds to this state, while a state, in which movable section 34 (or end effector 36) is positioned anterior to a front end 50 of workpiece 16 with respect to convey direction 20, may also correspond to this state.

Figure 6A:
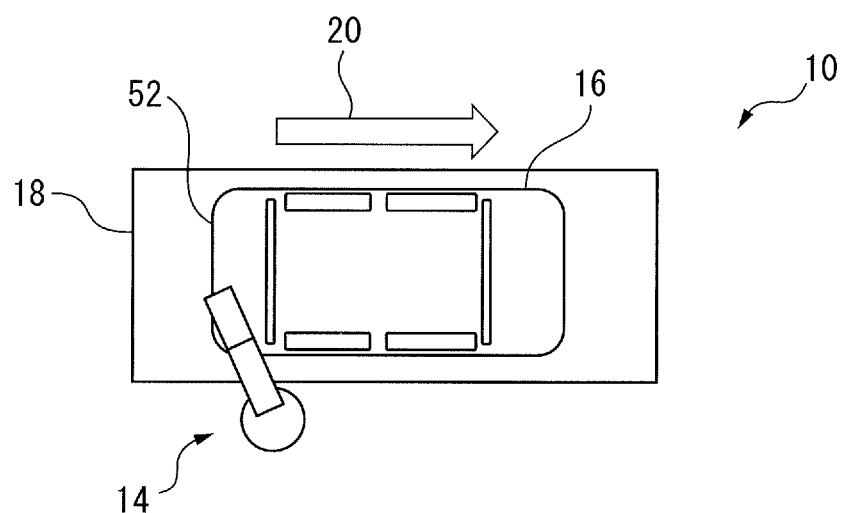
FIG. 6a shows a state in which the robot is positioned posterior to the workpiece with respect to the convey direction.
Figure 6B:
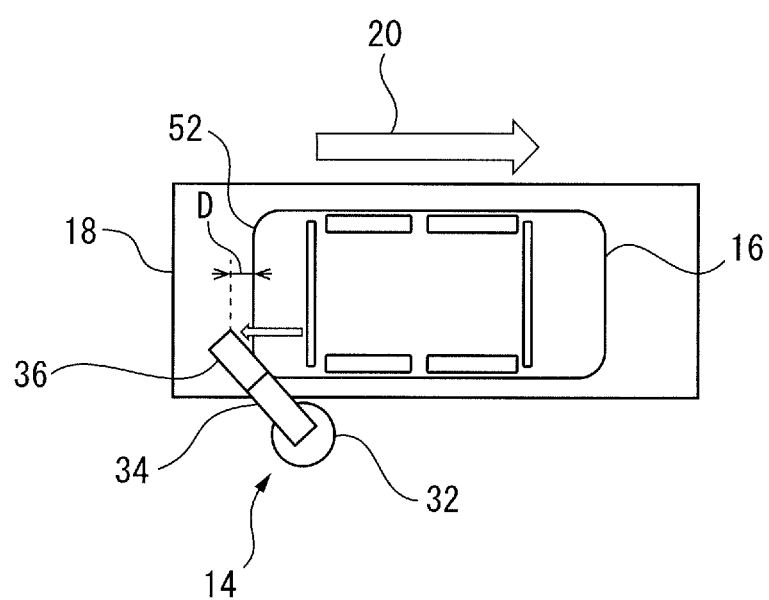

FIG. 6a shows another example of the movement direction of robot arm 34. In the example of FIG. 6a, when the abnormality or the contact relating to robot 14 is detected (i.e., the signal is received), robot arm 34 is positioned posterior to workpiece 16 with respect to convey direction 20. Then, after the signal is received, robot arm 34 is moved in the opposite direction to convey direction 20 of conveyor 18. Therefore, as shown in FIG. 6b, at least safe distance D is obtained between the movable section (robot arm 34 or end effector 36) of the robot and workpiece 16, whereby the safety of the human can be secured. In this regard, conveyor 18 (convey section 22) may continue to move after the abnormality or the contact relating to robot 14 is detected, and in such a case, robot 14 may be stopped after the minimum distance between the movable section of the robot and workpiece 16 reaches safe distance D or more. Alternatively, in the case that the minimum distance between movable section 34 and workpiece 16 is equal to safe distance D or more when the abnormality or the contact relating to robot 14 is detected, robot 14 may be immediately stopped.

In the present disclosure, the condition that "the movable section of the robot is positioned posterior to the workpiece with respect to the convey direction" means the state in which the workpiece does not exist posterior to the position of the movable section (e.g., the representative point such as a tool center point) of the robot with respect to the convey direction, and when the movable section is moved in the direction opposite to the convey direction, the distance between the movable section and the workpiece will be lengthened. For example, the state indicated in FIG. 6a corresponds to this state, while a state, in which movable section 34 (or end effector 36) is positioned anterior to a rear end 52 of workpiece 16 with respect to convey direction 20, may also correspond to this state.

Figure 7A:
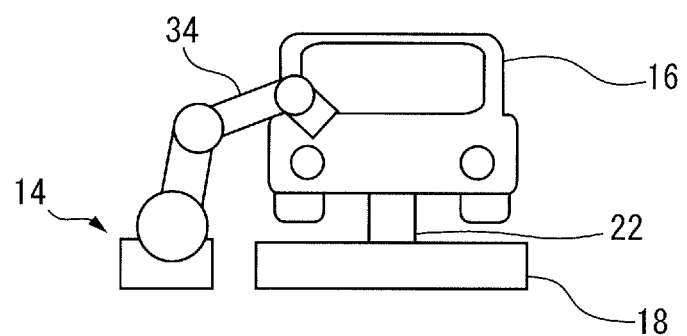
FIG. 7a shows a state in which the robot is positioned between front and rear ends of the workpiece with respect to the convey direction.
Figure 7B:
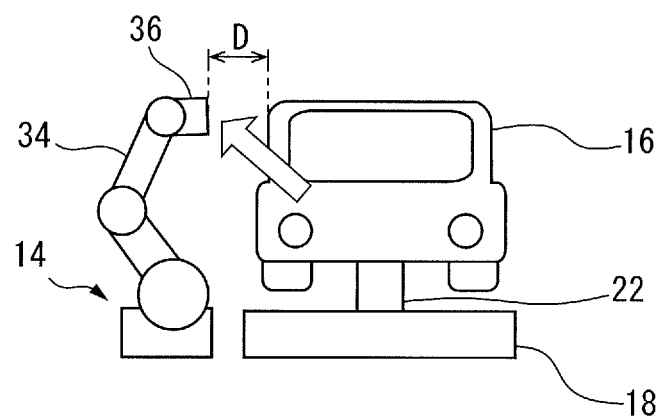

FIG. 7a shows another example of the movement direction of robot arm 34, in which robot 14 and conveyor 18 are viewed in the convey direction of conveyor 18. In other words, in FIG. 7a, the convey direction of conveyor 18 is perpendicular to the sheet. In the example of FIG. 7a, when the abnormality or the contact relating to robot 14 is detected (i.e., the signal is received), robot arm 34 is positioned between front end 50 and rear end 52 of workpiece 16 with respect to convey direction 20. In such a case, robot arm 34 may be moved generally along the direction perpendicular to convey direction 20 so as to be separated away from workpiece 16. Also in this case, as shown in FIG. 7b, at least safe distance D is obtained between the movable section (robot arm 34 or end effector 36) of the robot and workpiece 16, whereby the safety of the human can be secured. In this regard, conveyor 18 (convey section 22) may continue to move after the abnormality or the contact relating to robot 14 is detected, and in such a case, robot 14 may be stopped after the minimum distance between the movable section of the robot and workpiece 16 reaches safe distance D or more.

The motion of the robot as explained with reference to FIGS. 5a to 7b is merely example, and thus the robot may perform another motion as long as the minimum distance between the movable section of the robot and the workpiece is equal to safe distance D or more. Such motion of the robot may be stopped by input operation of the operator, etc., after the abnormality, etc., of the robot is resolved, and then, the robot may be controlled so as to perform a normal motion (or a predetermined operation, etc.).

In the prior art, when the abnormality or contact relating to the robot as explained above occurs, the robot is usually immediately stopped, or is usually controlled so as to evacuate or move toward a predetermined evacuating position. However, in the collaborative robot system, when the robot is immediately stopped or controlled so as to perform the evacuating motion, the distance between the movable section of the robot and the workpiece may be shortened, whereby the human may be sandwiched and injured between the movable section and the workpiece. In general, the human may be seriously injured by being sandwiched therebetween, and thus such a trouble should be preferentially avoided in comparison to a case in which the robot arm simply collides with the human, etc.

In view of the above, in the present disclosure, from when the abnormality or contact relating to the robot is detected, the motion of the robot is unusually controlled, i.e., the robot is controlled so that the minimum distance between the movable section of the robot and the workpiece is equal to or more than the predetermined safe distance. In this regard, the safe distance is set so that the human sandwiched between the robot and the workpiece is not injured. By virtue of such control, the safety of the human can be secured, without stopping conveyor 18. Therefore, in the present disclosure, even when the abnormality occurs in the robot or when the human contacts the robot, the necessity that the robot should perform the evacuating motion is relatively low, during, e.g., the robot passes a component to the operator and is sufficiently separated from the workpiece, and thus the robot can be controlled so that the robot continues the normal operation or the robot does not move (or is in a resting state). From this state, when the workpiece (or the conveyor) is moved and then the distance between the robot and the workpiece is shortened, it may be necessary that the robot performs the evacuating motion. However, before that, when the operator has restarted the robot, the (unnecessary) evacuating motion can be avoided. Accordingly, in the present disclosure, only when the probability that the human is sandwiched between the robot and the workpiece is relatively high, the robot can perform the evacuating motion.

In addition, after the abnormality or contact relating to the robot is detected (or the signal is received), when the movable section of the robot is moved so that the distance between the movable section and the workpiece is equal to the safe distance or more, the movable section may come close into the human in the vicinity of the robot (i.e., a danger to the human is posed). In such a case, it is preferable that the movement direction of the movable section of the robot be predetermined, or as to which axis of the robot (having plural axes) should be driven be predetermined, and that the predetermined result be previously noticed to the operator (human). Alternatively or additionally, it is preferable that the motion velocity of the robot after the signal is received be preset to a low value as possible.

According to the present disclosure, even when the conveyor is in action, it can be avoided that the workpiece on the conveyor comes into contact with the robot, and that the human is sandwiched between the workpiece and the robot.

While the invention has been described with reference to specific embodiments, it will be understood, by those skilled in the art, that various changes or modifications may be made thereto without departing from the scope of the following claims.

The invention claimed is:

1. A robot controller configured to control a robot, the robot being configured to perform an operation for a workpiece conveyed by a conveyor configured to move in a convey direction, and being located at a position different from the conveyor, the robot controller comprising:
a processor configured to:
receive a signal representing that an abnormality of the robot is detected or contact against the robot is detected;
after receiving the signal, control the robot to move away from the workpiece such that a minimum distance between the robot and the workpiece is not less than a predetermined safe distance;
after receiving the signal when the robot is positioned anterior to the workpiece with respect to the convey direction, control the robot to move in the same direction as the convey direction at a velocity higher than the conveyor; and
after receiving the signal when the robot is positioned posterior to the workpiece with respect to the convey direction, control the robot to move in the opposite direction to the convey direction.

2. The robot controller as set forth in claim 1, wherein the signal representing that the abnormality of the robot is output from an encoder on an axis of the robot.

3. The robot controller as set forth in claim 1, wherein the signal representing that the contact against the robot is detected is output from a contact sensor, a torque sensor or a force sensor provided to the robot.

4. The robot controller as set forth in claim 1, wherein the conveyor is configured to not stop when the processor receives the signal, and the robot is configured to perform a normal motion when the abnormality of the robot is resolved or when the contact against the robot is undetected.

5. A robot control method of controlling a robot, the robot being configured to perform an operation for a workpiece conveyed by a conveyor configured to move in a convey direction, and being located at a position different from the conveyor, the robot control method comprising:
receiving, by a processor, a signal representing that an abnormality of the robot is detected or contact against the robot is detected;
after receiving the signal, controlling the robot to move away from the workpiece such that a minimum distance between the robot and the workpiece is not less than a predetermined safe distance;
after receiving the signal when the robot is positioned anterior to the workpiece with respect to the convey direction, controlling the robot to move in the same direction as the convey direction at a velocity higher than the conveyor; and
after receiving the signal when the robot is positioned posterior to the workpiece with respect to the convey direction, controlling the robot to move in the opposite direction to the convey direction.

6. The robot control method as set forth in claim 5, further comprising:
not stopping the conveyor when the processor receives the signal, and
controlling the robot so as to perform a normal motion when the abnormality of the robot is resolved or when the contact against the robot is undetected.

* * * * *